United States Patent
Komatsu et al.

(10) Patent No.: US 6,185,066 B1
(45) Date of Patent: Feb. 6, 2001

(54) MAGNETIC DISK DRIVE (75) Inventors: Hisateru Komatsu, Tendo; Norito Yasuwaki; Hideaki Hayasaka, both of Yamagata; Mamoru Takahashi, Murayama; Makoto Takahashi, Obanazawa, all of (JP)

(73) Assignee: Mitsumi Electric Co., Ltd., Tokyo (JP)

( * ) Notice: Under 35 U.S.C. 154(b), the term of this patent shall be extended for 0 days.

(21) Appl. No.: 09/172,529

(22) Filed: Oct. 14, 1998

(30) Foreign Application Priority Data

Oct. 14, 1997 (JP) .................................................... 9-280778

(51) Int. Cl.$^7$ ............................. G11B 17/04; G11B 33/02
(52) U.S. Cl. ......................................... 360/99.06; 369/77.2
(58) Field of Search ........................... 360/99.06, 99.02, 360/96.5; 369/75.2, 77.1, 77.2

(56) References Cited

U.S. PATENT DOCUMENTS 5,323,371 * 6/1994 Nagase et al. ........................ 369/75.2
5,359,478 * 10/1994 Kawano .............................. 360/99.06
5,400,198 * 3/1995 Suzuki et al. ....................... 360/99.05

FOREIGN PATENT DOCUMENTS 8-171765 * 7/1996 (JP) .

* cited by examiner

Primary Examiner—David Davis
(74) Attorney, Agent, or Firm—Frishauf, Holtz, Goodman, Langer & Chick, P.C.

(57) ABSTRACT

A locking plate 40 is provided near the front end of a magnetic disk mounted on a magnetic disk drive to prevent downward sliding movement of a disk holder 13. The locking plate is located at a first position between a chassis 11 and the disk holder to lock the disk holder when no magnetic disk is mounted on the magnetic disk drive. When the magnetic disk is mounted on the magnetic disk drive, the locking plate engages with the front end of the magnetic disk and moves to a second position out of the position between the chassis and the disk holder.

3 Claims, 10 Drawing Sheets

MAGNETIC DISK DRIVE

BACKGROUND OF THE INVENTION

The present invention relates to a magnetic disk drive for recording and reproducing information on a flexible disk housed in a case of a magnetic disk. More specifically, the present invention relates to an improvement of impact measures therefor.

Magnetic disk drives of the type described is some type of a device on which a magnetic disk can be mounted and held by a magnetic disk table for the purpose of recording and reproducing information. The magnetic disk table is for rotation driving the magnetic disk while holding it. A magnetic head is used to record and reproduce information on the magnetic disk. The magnetic disk drives also include a magnetic disk mounting and ejection assembly for use in ejecting a magnetic disk out of the magnetic disk drive after recording or reproduction of information.

Figure 1:
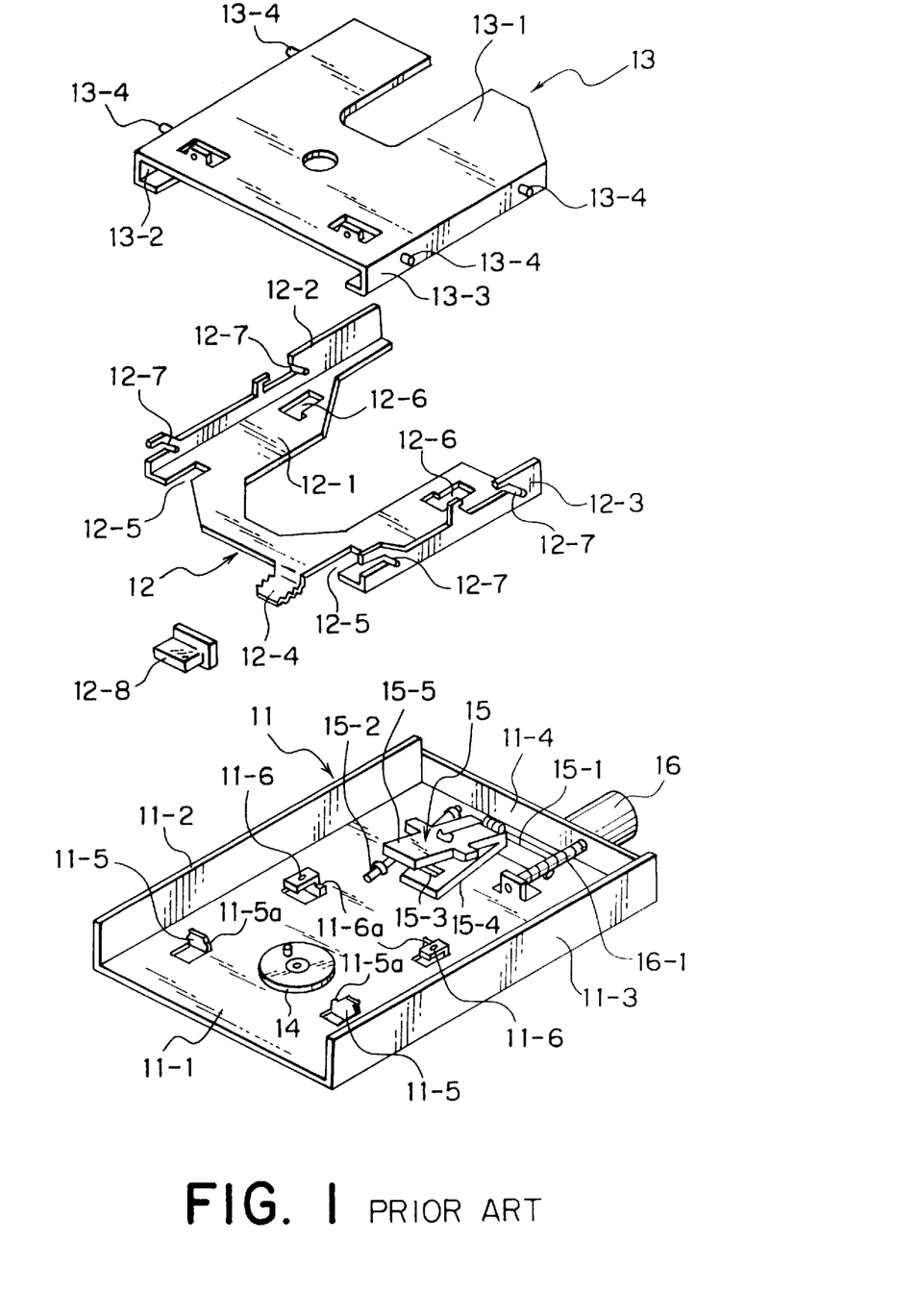
FIG. 1 is an exploded perspective view illustrating schematically an example of a magnetic disk drive in which the present invention can be implemented.

FIG. 1 is an exploded perspective view of a typical magnetic disk drive in particular with a magnetic disk mounting and ejection assembly being illustrated separately. In FIG. 1, the magnetic disk drive comprises a chassis 11 formed by pressing a sheet metal, an eject plate 12, and a disk holder 13.

The chassis 11 has a main base section 11-1, opposing side walls 11-2 and 11-3, a back end wall 11-4, two support claws 11-5 and different two support claws 11-6. The side walls 11-2 and 11-3 extend upward at right angles from both side edges of the plate-like main base section 11-1. Likewise, the back end wall 11-4 extends upward at right angles from the rear edge of the main base section 11-1. Each of the support claws 11-5 and 11-6 is formed by means of cutting and raising a portion of the main base section 11-1. The support claws 11-5 and 11-6 have shoulder portions 11-5a and 11-6a, respectively. Each of the shoulder portions 11-5a and 11-6a is a notch formed in the respective support claws.

A magnetic disk table 14 and a carriage mechanism 15 are mounted on the main base section 11-1 in the direction along the side walls of the chassis 11. The magnetic disk table 14 is for rotation driving a magnetic disk while holding it. The carriage mechanism 15 is for use in driving a pair of magnetic heads in the direction of a track in the magnetic disk. More specifically, an upper magnetic head and a lower magnetic head are driven in the track direction on a top surface and a back (under) surface, respectively, of the magnetic disk. A stepping motor 16 is mounted on the back end wall 11-4 of the chassis 11. The stepping motor 16 has a rotation shaft 16-1 with a helical thread therein and is arranged so that the rotation shaft 16-1 extends in the direction along the side walls of the chassis 11. The magnetic disk table 14 is directly connected to and rotation driven by a rotor assembly of a magnetic disk driving motor disposed beneath the chassis 11.

The carriage mechanism 15 has a carriage base body at a rear portion thereof, as described more in detail below. The carriage mechanism 15 is slidably supported by a guide shaft 15-2 that is fixed to the main base section 11-1 at the carriage base body. A carriage arm 15-1 is provided on the carriage base body. The carriage arm 15-1 has a pin at the tip thereof. The pin engages with the helical thread formed in the rotation shaft 16-1. In response to rotation of the stepping motor 16, the carriage arm 15-1 cooperates with the rotation of the stepping motor 16 and reciprocates back and forth. This moves the carriage arm 15-1 linearly in the direction along the side walls of the chassis 11, that is, in the radial direction of the magnetic disk. The carriage mechanism 15 has a lower carriage 15-4 and an upper carriage 15-5. The lower carriage 15-4 carries a magnetic head 15-3 for the back surface of the magnetic disk. The upper carriage 15-5 carries a magnetic head (not shown) for the top surface of the magnetic disk. The upper carriage 15-5 is rotatable about the edge of the carriage base body. The upper carriage 15-1 rotates upward when a magnetic disk is inserted into the carriage mechanism 15 and then rotates downward when the magnetic disk is completely mounted in the disk drive. The upper magnetic head thus approaches the top surface of the magnetic disk.

The eject plate 12 comprises a main plate section 12-1, a side plates 12-2 and 12-3 and a front end projection 12-4. The main plate section 12-1 has a generally U shape. The side plates 12-2 and 12-3 extend vertically from both side edges of the main plate section 12-1. The front end projection 12-4 is for mounting an eject button thereon and extends forward from the front edge of the main plate section 12-1. Two notches 12-5 and two holes 12-6 are formed in the main plate section 12-1 at the position corresponding to the support claws 11-5 and 11-6, respectively, of the chassis 11. Guide grooves 12-7 are formed in the side plates 12-3 and 12-4, two for each side plate. The guide groove 12-7 includes a horizontal portion and a tilt portion.

The eject plate 12 is assembled with the chassis 11 with the support claws 11-5 and 11-6 passed through the notches 12-5 and the holes 12-6, respectively. When being assembled, the configuration of the notches 12-5 and the holes 12-6 of the main plate section 12-1 are supported by the shoulders 11-5a and 11-6a of the support claws 11-5 and 11-6, respectively. Thus the eject plate 12 is slidable back and forth relative to the chassis 11. The eject plate 12 is allowed only slight or no movement in the up and down direction and the right and left directions. Though depending on the actual configurations, the notches 12-5 and the holes 12-6, as well as the support claws 11-5 and 11-6 are limitations to such movement.

As described above, the main plate section 12-1 has a generally U shape. Therefore, the eject plate 12 is slidable without interrupting operation of the magnetic disk table 14 and the carriage mechanism 15.

The disk holder 13 has a main base section 13-1, opposing side walls 13-2 and 13-3, and four projecting pins 13-4. The main base section 13-1 has a notch portion not to cause contact with the upper magnetic head in the carriage mechanism 15. The side walls 13-2 and 13-3 extend downward at right angles from both side edges of the main base section 13-1. The free end of the side walls 13-2 and 13-3 is bent inward to hold the magnetic disk. The projecting pins 13-4 are projected outward from the side walls 13-2 and 13-3 at the position corresponding to the guide grooves 12-7 in the eject plate 12. The disk holder 13 is assembled with the eject plate 12 with the projecting pins 13-4 passed through the guide grooves 12-7.

With the above-mentioned structure the disk holder 13 is slidable upward and downward. The disk holder 13 is allowed only slight or no movement in the back and forth direction and the right and left directions. More specifically, the disk holder 13 is slidable upward and downward in cooperation with the back-and-forth movement of the eject plate 12, depending on the shape of the guide grooves 12-7 formed in the eject plate 12. A tension spring (not shown) is provided between the eject plate 12 and the disk holder 13. The tension spring pulls the eject plate 12 towards the front portion of the chassis 11. The eject plate 12 is locked with a locking member (not shown) at a rear portion of the chassis 11 against the pulling force of the tension spring. In addition, there is an eject member (not shown) provided to apply force, in cooperation with the locking member, to the magnetic disk in the direction to eject it out of the assembly. An eject button 12-8 is mounted on the front end projection 12-4 to allow an operator to eject the magnetic disk.

Next, operation of mounting and ejecting a magnetic disk with the disk holder having the above-mentioned structure is described. In the absence of the magnetic disk, the eject plate 12 is located backward with being locked by the locking member. The tension spring is expanded. In this event, the projection pins 13-4 engage with the horizontal portions of the corresponding guide grooves 12-7. The disk holder is located at an upper portion.

When the magnetic disk is inserted into a slit in the front face of the disk holder 13 located at an upper portion, the locking mechanism is disengaged. The eject plate 12 is pulled by the expanded tension spring and moves forward. The projecting pins 13-4 move downward along the moving guide grooves 12-7. This lowers the disk holder 13 and complete disk mounting operation. The magnetic disk is now ready to be accessed to record and/or reproduce information.

In this state, the eject plate 12 moves backward and is locked again by the locking member when the eject button 12-8 is depressed. The tension spring is kept expanded. Then the projecting pin 13-4 moves upward along the moving guide grooves 12-7. The disk holder 13 thus located upward. The eject member acts on the magnetic disk to eject it out of the assembly in cooperation with the locking member.

The magnetic disk drives of the type described are built in portable electronic devices such as a portable personal computer and a word processor. Such electronic devices often receive vibration and shock particularly when a user picks up it or brings it with him or her to go somewhere. The vibration acts on the built-in magnetic disk drive as well. The vibration or impact may act in the up and down direction of the magnetic disk drive, that is, the vertical direction relative to the chassis 11 with no magnetic disk mounted on the magnetic disk drive. If this happens, the following problems occur. The impact may displace the disk holder 13 downward. The impact may also rotate the upper carriage 15-5 downward to the extent that the magnetic head collides with the magnetic head on the back side, damaging or breaking the magnetic head.

Figure 2:
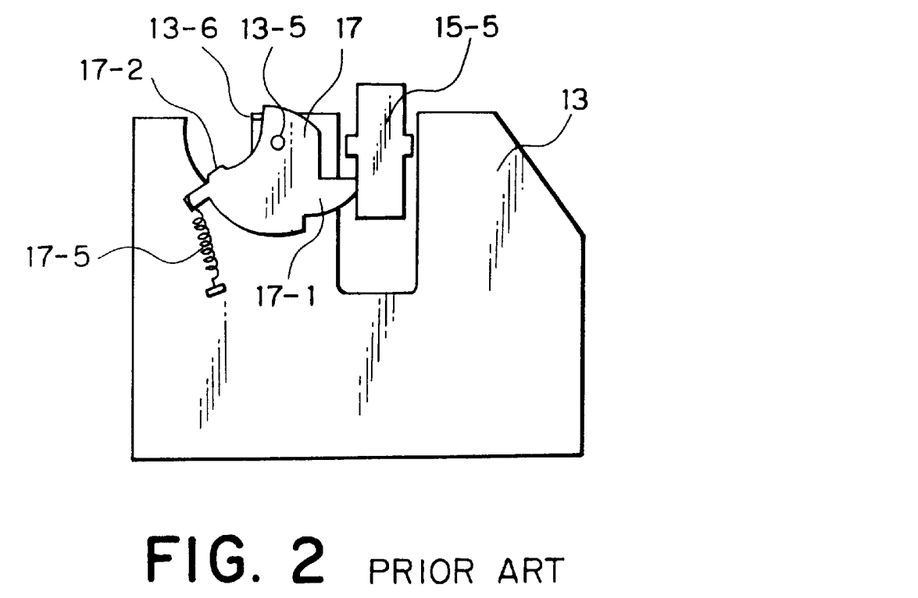
FIG. 2 is a plan view of a conventional locking mechanism for use in describing a conventional measure against impact or vibration acting on an upper carriage of a carriage mechanism.
Figure 3:
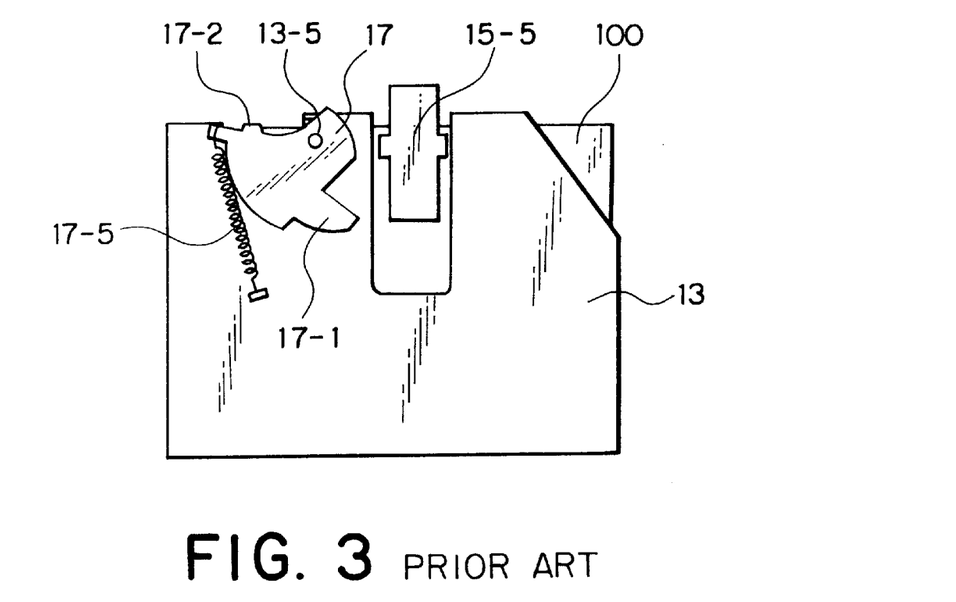
FIG. 3 is a plan view of the locking mechanism in FIG. 2 with a magnetic disk mounted thereon.

Referring to FIGS. 2 and 3, a magnetic disk drive is described that comprises means to solve the above-mentioned problems. In FIG. 2, a lock plate 17 is rotatably mounted on the disk holder 13 in parallel with the major surface thereof. The lock plate 17 is rotatable about a support shaft 13-5 provided on the major surface of the disk holder 13. The lock plate 17 comprises a locking piece 17-1 and an engaging piece 17-2. The locking piece 17-1 is at a lock position just beneath the upper carriage 15-5 with no magnetic disk mounted on the magnetic disk drive to interfere downward movement of the upper carriage 15-5. The engaging piece 17-2 engages with a front end of the magnetic disk when it is mounted on the magnetic disk drive. The engaging piece 17-2 then rotates the entire lock plate 17. The engaging piece 17-2 extends downward from the major surface of the lock plate 17.

As shown in FIG. 3, the lock plate 17 rotates about the support shaft 13-5 when the front end of a magnetic disk 100 engages with the engaging piece 17-2. The engaging piece 17-2 moves out of the position just beneath the upper carriage 15-5 and releases the lock. A spring member 17-5 is provided between the lock plate 17 and the disk holder 13 to connect them. The spring member 17-5 is for automatically returning the engaging piece 17-2 to the above-mentioned lock position when the magnetic disk is removed out of the disk drive. A lock piece 13-6 is provided at the front end of the disk holder 13 to restrict at the locking position in FIG. 2 the rotation of the lock plate 17 by the spring member 17-5.

With this lock plate 17, the upper carriage 15-5 does not rotate even if the magnetic disk drive is suffered from impact or vibration with no magnetic disk mounted thereon. Therefore, the magnetic head on the upper carriage 15-5 can be prevented from colliding with the magnetic head on the lower carriage 15-4. However, there has been no measure against displacement of the disk holder 13 due to the effect of impact or vibration.

SUMMARY OF THE INVENTION

Accordingly, an object of the present invention is to provide a magnetic disk drive having a locking mechanism that serves to prevent displacement of a disk holder due to an effect of impact or vibration.

Another object of the present invention is to provide a magnetic disk drive having a locking mechanism that serves to prevent displacement of a disk holder due to an effect of impact or vibration, as well as to avoid collision between upper and lower magnetic heads.

A magnetic disk drive according to the present invention comprises an eject plate mounted on a chassis, the eject plate being slidable in the direction of mounting and ejecting a magnetic disk by means of an external force; a disk holder assembled with the eject plate for holding the magnetic disk, the disk holder being slidable up and down in cooperation with the sliding movement of the eject plate; and a carriage mechanism having magnetic heads mounted thereon for recording and reproducing data on and out of the magnetic disk, the carriage mechanism holding the magnetic heads in a manner that the magnetic heads are movable in a predetermined radial direction relative to the magnetic disk.

According to an aspect of the present invention, the magnetic disk drive further comprises a locking mechanism for restricting downward sliding movement of the disk holder, the locking mechanism being provided at a position close to a front end of the magnetic disk mounted on the magnetic disk drive. The locking mechanism is located at a first position to lock the disk holder, the first position being between the chassis and the disk holder when no magnetic disk is mounted on the magnetic disk drive. The locking mechanism engages with the front end of the magnetic disk when it is mounted on the disk drive and moves to a second position away from the first position between the chassis and the disk holder.

BRIEF DESCRIPTION OF THE DRAWINGS

FIG. 16 is a perspective view for use in describing relation between a carriage mechanism of a magnetic disk drive and a driving mechanism therefor that the present invention can be implemented in.

DESCRIPTION OF THE PREFERRED EMBODIMENTS

Referring to FIGS. 4 through 7, a first embodiment of the present invention is described. The first embodiment can be implemented in the magnetic disk drive as described in conjunction with FIG. 1. Therefore, similar components and parts to those in FIG. 1 are depicted by similar reference numerals and detailed description thereof will be omitted. In addition, the eject plate is not illustrated in these figures. The first embodiment provides a locking plate 40 at a position near the front end of the magnetic disk 100 mounted on the magnetic disk drive. The locking plate 40 is for preventing downward sliding movement of the disk holder 13. The locking plate 40 comprises a locking member 41 and an engaging member 42. The locking member 41 is for preventing the downward sliding movement of the disk holder 13. The engaging member 42 is provided on the tip of the locking member 41 and engages with the magnetic disk 100. The engaging member 42 is formed into a generally U shape and is positioned forward the locking member 41. The locking plate 40 further comprises a mounting member 43 and a connecting member 44. The mounting member 43 is for mounting the locking plate 40 to the chassis 11. The connecting member 44 has a U shape and connects the mounting member 43 to the locking member 41. In particular, the locking plate 40 is made of a metal plate and the connecting member 44 is formed into a U shape to impart a spring-like function to the locking plate 40. The connecting member 44 on the side of the locking member 41 is raised diagonally up to lift the locking member 41.

The mounting member 43 is fixed to a seating 11-7 formed on the chassis 11 with a screw 30. The chassis 11 also has a support plate 11-8 formed by means of cutting and lifting a portion of the chassis 11 at the position just beneath the locking member 41. A horizontally extending projection 13-7 is formed on the front edge of the disk holder 13 at the position corresponding to the support plate 11-8.

Figure 4:
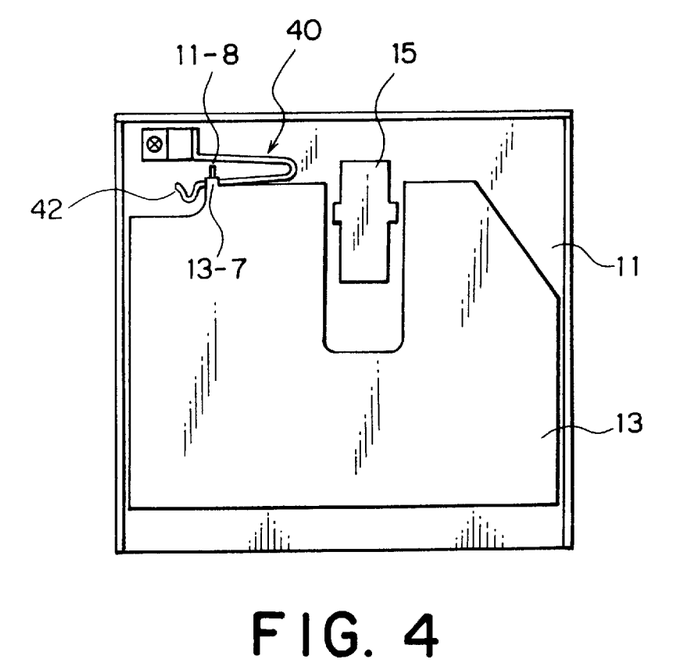
FIG. 4 is a schematic plan view of a magnetic disk drive having a locking mechanism according to a first embodiment of the present invention.

FIG. 4 shows the magnetic disk drive with no magnetic disk 100 is mounted thereon. In this state, the locking member 41 is at a first position between the support plate 11-8 of the chassis 11 and the projection 13-7 of the disk holder 13. The locking member 41 restricts the downward sliding movement of the disk holder 13 accordingly.

Figure 5:
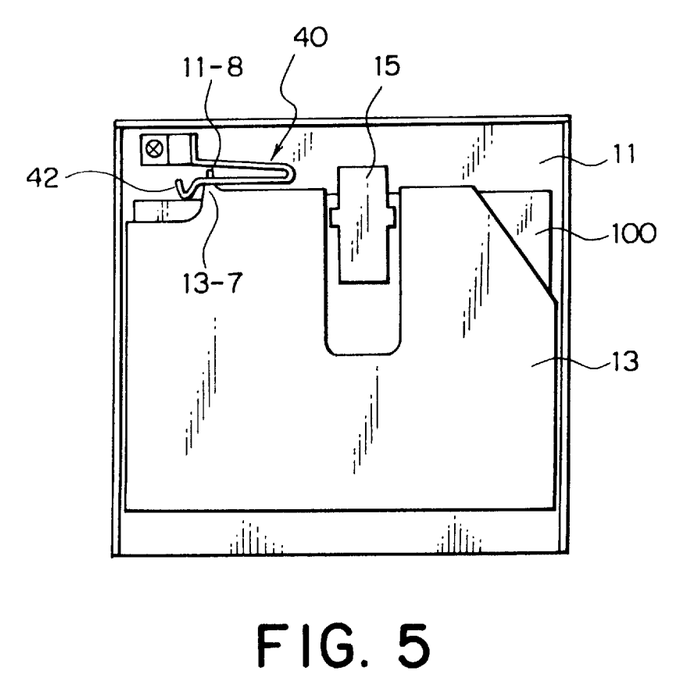
FIG. 5 is a plan view of the magnetic disk drive in FIG. 4 with a magnetic disk mounted thereon.
Figure 6:
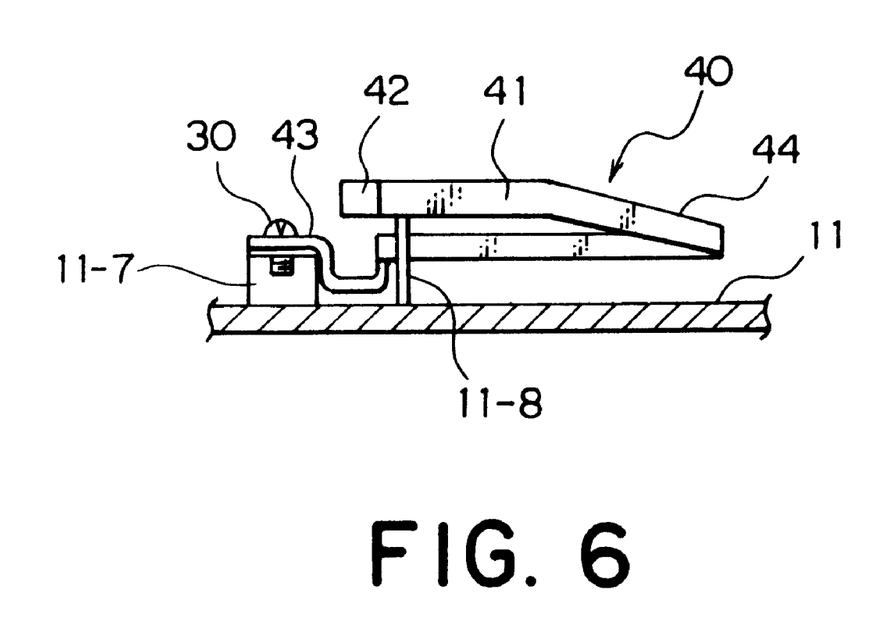
FIG. 6 is a side view of the locking mechanism in FIG. 4.
Figure 7:
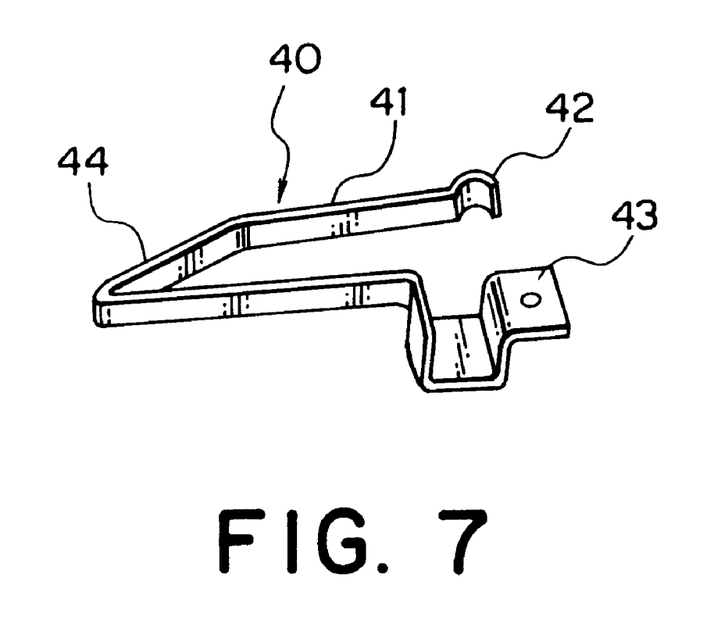
FIG. 7 is a perspective view of a locking plate shown in FIG. 4.

FIG. 5 shows the magnetic disk drive with the magnetic disk 100 mounted thereon. In this state, the engaging member 42 engages with the front end of the magnetic disk 100 and is pushed backward. As a result, the locking member 41 moves to a second position that is out of the first position between the projection 13-7 and the support plate 11-8. Then, the locking member 41 is released and the disk holder 13 is allowed to slide downward. The disk holder 13 not being locked by the locking member slides downward in cooperation with the eject plate. The locking plate 40 has a function as a spring, so that the locking member 41 automatically returns to the first position from the second position when the magnetic disk 100 is removed.

The above-mentioned locking plate 40 ensures to prevent downward displacement of the disk holder 13 even when the magnetic disk drive is suffered from impact or vibration.

Referring to FIGS. 8 through 11, a second embodiment of the present invention is described. The second embodiment can also be implemented in the magnetic disk drive as described in conjunction with FIG. 1. As in the first embodiment, no detailed description is made about the disk holder 13 and the carriage mechanism 15 mounted on the chassis 11. In addition, the eject plate is not illustrated in these figures. The second embodiment provides a locking plate 50 at a position near the front end of the magnetic disk mounted on the magnetic disk drive. The locking plate 50 is for preventing downward sliding movement of the disk holder 13. The locking plate 50 comprises a locking member 51 and an engaging member 52. The locking member 51 is for preventing the downward sliding movement of the disk holder 13. The engaging member 52 engages with the magnetic disk. The engaging member 52 is formed into a generally U shape and is positioned forward the locking member 51. The locking plate 50 further comprises a mounting member 53 and a connecting member 54. The mounting member 53 is for mounting the locking plate 50 to the chassis 11. The connecting member 54 connects the mounting member 53 to the engaging member 52. The locking plate 50 is made of a metal plate and the connecting member 54 is bent from the mounting member 53 to form an L shape section, thereby to impart a spring-like function to the locking plate 50.

The mounting member 53 is fixed to the chassis 11 with a screw 31. The chassis 11 also has a support plate 11-9 formed by means of cutting and lifting a portion of the chassis 11 at the position just beneath the locking member 51. An L-shaped projection 13-8 is formed on the front edge of the disk holder 13 at the position corresponding to the support plate 11-9. The L-shaped projection 13-8 extends downward and then horizontally.

Figure 8:
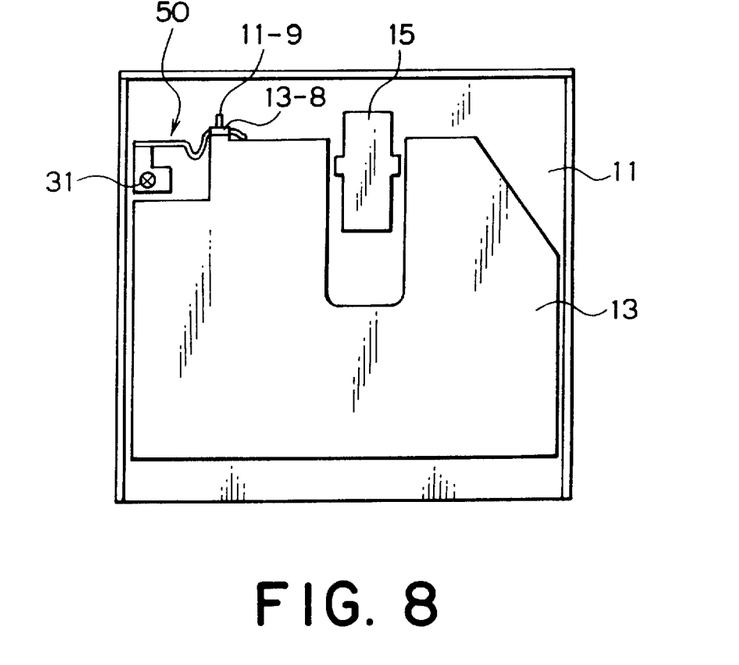
FIG. 8 is a schematic plan view of a magnetic disk drive having a locking mechanism according to a second embodiment of the present invention.

FIG. 8 shows the magnetic disk drive with no magnetic disk is mounted thereon. In this state, the locking member 51 is at a first position between the support plate 11-9 of the chassis 11 and the projection 13-8 of the disk holder 13. The locking member 51 restricts the downward sliding movement of the disk holder 13 accordingly.

Figure 9:
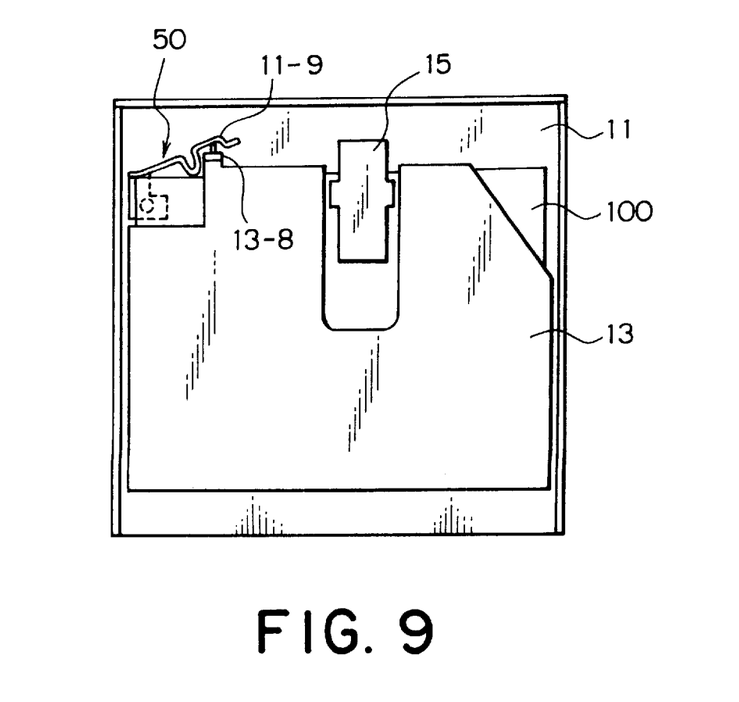
FIG. 9 is a plan view of the magnetic disk drive in FIG. 8 with a magnetic disk mounted thereon.
Figure 10:
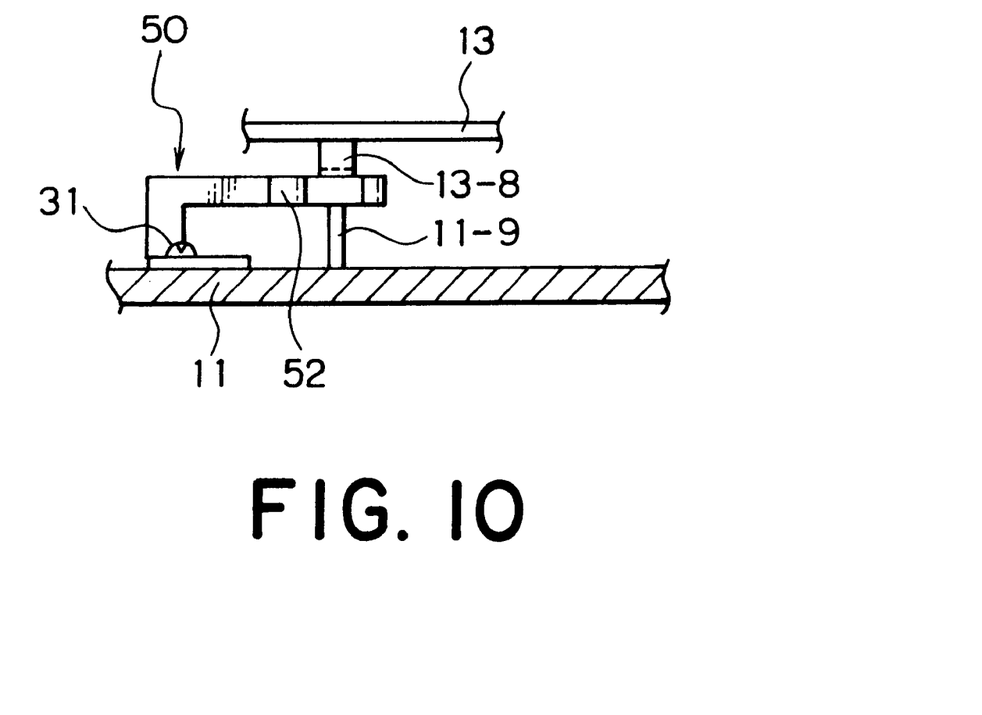
FIG. 10 is a side view of the locking mechanism in FIG. 8.
Figure 11:
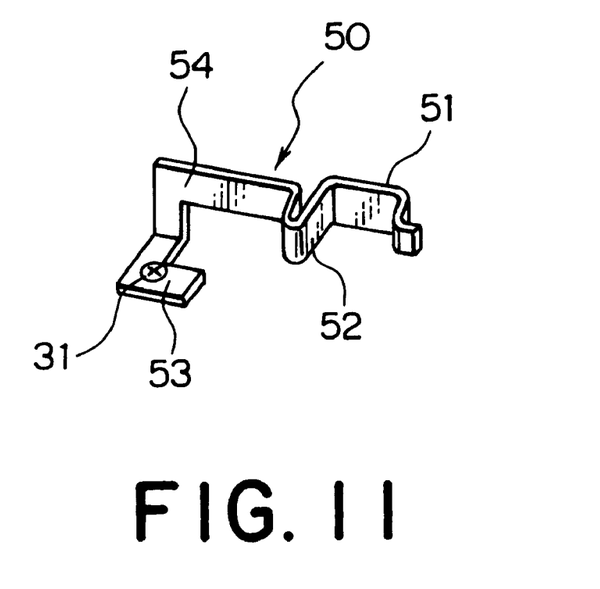
FIG. 11 is a perspective view of a locking plate shown in FIG. 8.

FIG. 9 shows the magnetic disk drive with the magnetic disk 100 mounted thereon. In this state, the engaging member 52 engages with the front end of the magnetic disk 100 and is pushed backward. As a result, the locking member 51 moves to a second position that is out of the first position between the projection 13-8 and the support plate 11-9. Then, the locking member 51 is released and the disk holder 13 is allowed to slide downward. The disk holder 13 not being locked by the locking member 51 slides downward in cooperation with the eject plate. The locking plate 50 has a function as a spring, so that the locking member 51 automatically returns to the first position from the second position when the magnetic disk 100 is removed.

The above-mentioned locking plate 50 ensures to prevent downward displacement of the disk holder 13 even when the magnetic disk drive is suffered from impact or vibration.

Referring to FIGS. 12 through 15, a third embodiment of the present invention is described. The third embodiment can also be implemented in the magnetic disk drive as described in conjunction with FIG. 1. As in the first embodiment, no detailed description is made about the disk holder 13 and the carriage mechanism 15 mounted on the chassis 11. In addition, the eject plate is not illustrated in these figures. The third embodiment provides a locking plate 60 on the disk holder 13 at the position near the front end of the magnetic disk mounted on the magnetic disk drive. The locking plate 60 is for preventing downward sliding movement of the disk holder 13 and for restricting downward rotation of the upper carriage 15-5 (see FIG. 1).

The locking plate 60 is made of a sheet of metal plate and is rotatably mounted about a support shaft 13-9 on the disk holder 13 such that it is rotated in parallel with the major surface of the disk holder 13.

The locking plate 60 comprises a first locking member 61, a second locking member 62, and an engaging member 63. The first locking member 61 is for restricting downward sliding of the disk holder 13 while the second locking member 62 is for restricting downward rotation of the upper carriage 15-5. The engaging member 63 engages with the magnetic disk 100. The first locking member 61 extends downward from the major surface of the locking plate 60 at the position corresponding to the front edge of the disk holder 13. The second locking member 62 extends horizontally in parallel with the major surface of the locking plate 60. The engaging member 63 extends downward at the position close to the side edge of the disk holder 13 and then bent to form a U-shape section.

Figure 12:
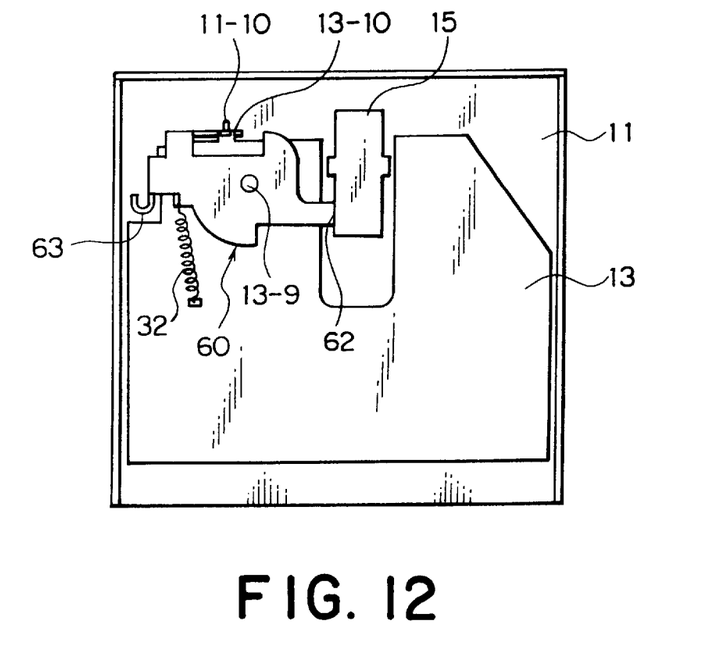
FIG. 12 is a schematic plan view of a magnetic disk drive having a locking mechanism according to a third embodiment of the present invention.
Figure 14:
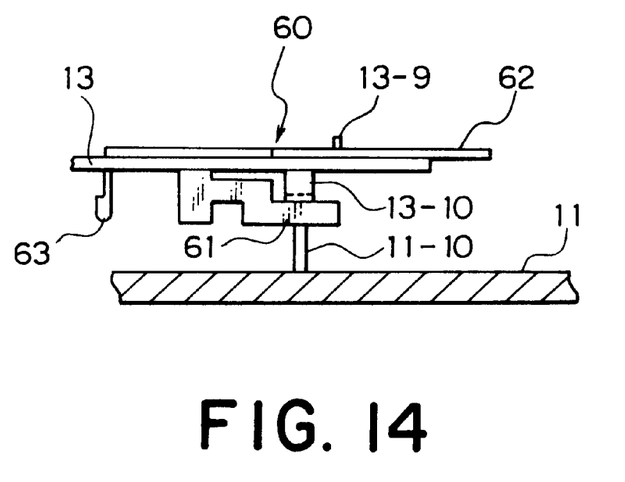
FIG. 14 is a side view of the locking mechanism in FIG. 12.
Figure 15:
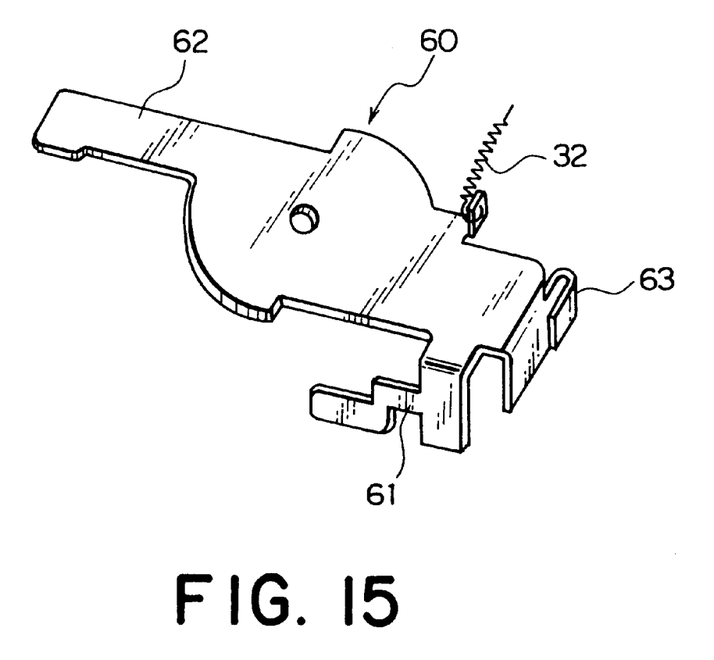
FIG. 15 is a perspective view of a locking plate shown in FIG. 12.

The chassis 11 has a support plate 11-10 formed by means of cutting and lifting a portion of the chassis 11 at the position just beneath the first locking member 61. An L-shaped projection 13-10 is formed on the front edge of the disk holder 13 at the position corresponding to the support plate 11-10. The L-shaped projection 13-10 extends downward and then horizontally.

FIG. 12 shows the magnetic disk drive with no magnetic disk 100 is mounted thereon. In this state, the first locking member 61 is at a locking position between the projection 13-10 of the disk holder 13 and the support plate 11-10 of the chassis 11 as shown in FIG. 14. The first locking member 61 restricts the downward sliding movement of the disk holder 13. The second locking member 62 is at a locking position just beneath the upper carriage 15-5. The second locking member 62 restricts the downward rotation of the upper carriage 15-5.

Figure 13:
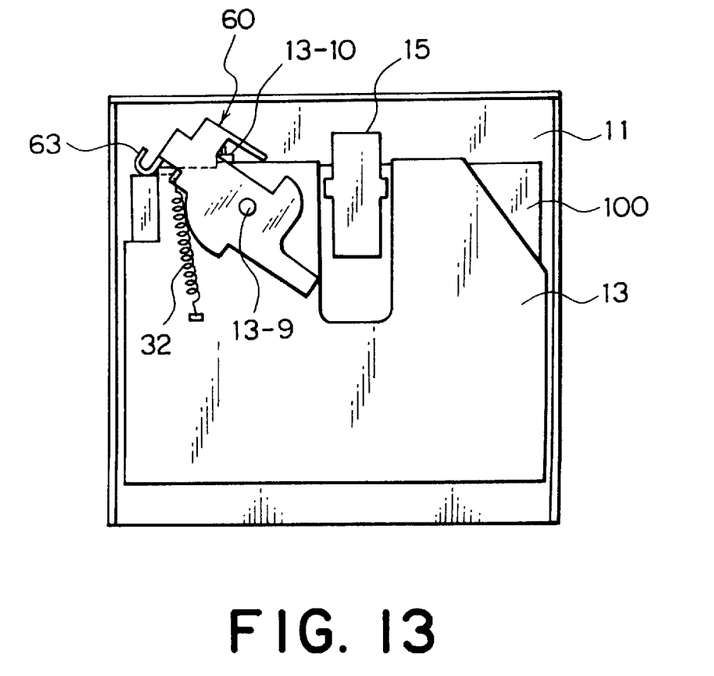
FIG. 13 is a plan view of the magnetic disk drive in FIG. 12 with a magnetic disk mounted thereon.

FIG. 13 shows the magnetic disk drive with the magnetic disk 100 mounted thereon. In this state, the engaging member 63 engages with the front end of the magnetic disk 100. This rotates the entire locking plate 60. As a result, rotation of the entire locking plate 60 moves the first locking member 61 to a position that is out of the locking position between the projection 13-10 and the support plate 11-10. At the same time, the second locking member 62 moves out of the locking position just beneath the upper carriage 15-5.

As a result, the lock by the first and the second locking members 61 and 62 is released and the disk holder 13 is allowed to slide downward. Then the disk holder 13 slides downward in cooperation with the eject plate. On the other hand, the upper carriage 15-5 rotates upward to receive the magnetic disk, and then moves downward. At that state, the upper magnetic head comes close to the upper surface of the magnetic disk.

The major surface of the locking plate 60 is connected to the major surface of the disk holder 13 via a coil spring 32. The coil spring 32 serves to rotate the locking plate 60 and in turn to automatically return the first and the second locking members 61 and 62 to their respective original positions when the magnetic disk 100 is removed out of the magnetic disk drive.

The above-mentioned locking plate 60 ensures to prevent downward displacement of the disk holder 13 and downward rotation of the upper carriage 15-5 even when the magnetic disk drive is suffered from impact or vibration.

In the present invention, yet another measure is provided against the problem of impact and vibration that act on the magnetic disk drive. This measure is described below.

Figure 16:
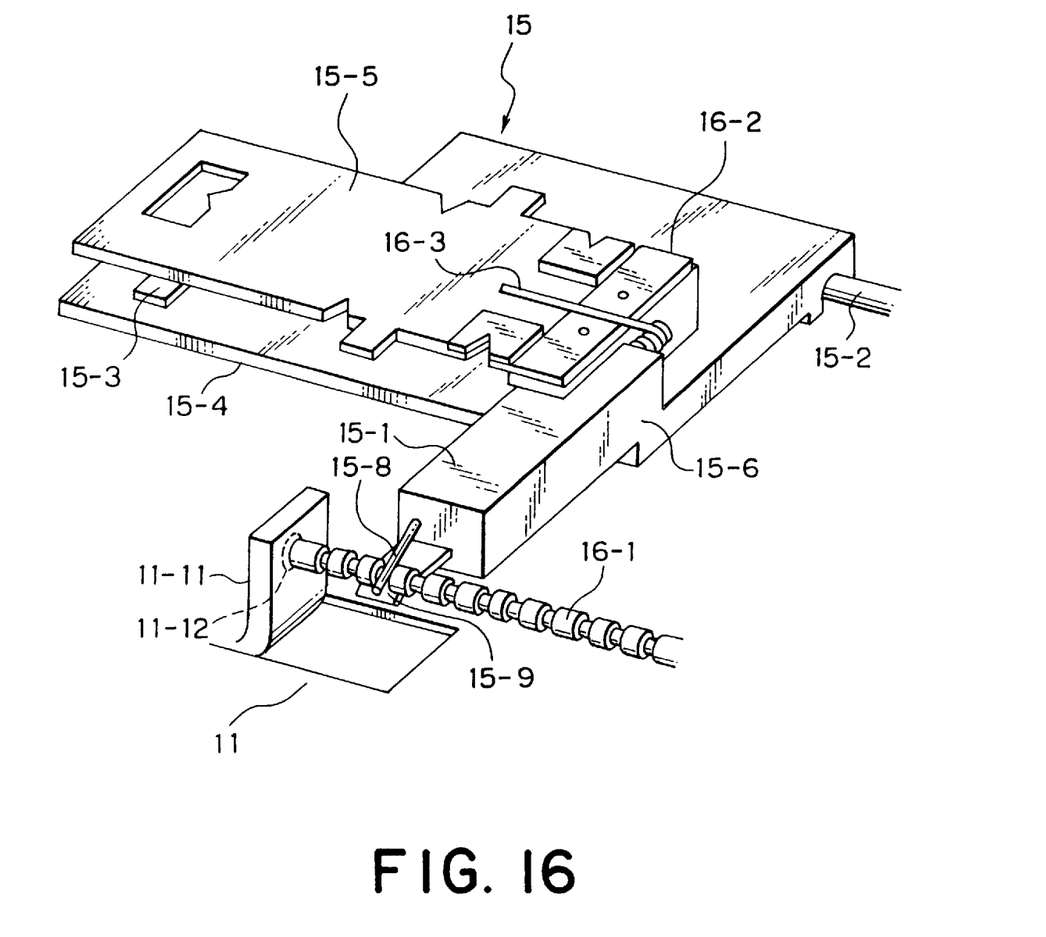

FIG. 16 shows the carriage mechanism 15 in FIG. 1. The carriage mechanism 15 comprises the lower carriage 15-4 and the upper carriage 15-5. The lower carriage 15-4 is provided with the magnetic head 15-3 on the upper surface of the latter at the tip thereof. Likewise, the upper carriage 15-5 is provided with a magnetic head (not shown) on the back or under surface of the latter at the tip thereof. The rear edge of the lower carriage 15-4 is integrally formed with a carriage base body 15-6. The carriage arm 15-1 is provided on the carriage base body 15-6 such that the arm extends in the direction toward the rotation shaft 16-1 of the stepping motor 16 (FIG. 1). The carriage arm 15-1 comprises, at the end thereof, a pin 15-8 and a flat spring 15-9. The pin 15-8 engages with the helical thread formed in the rotation shaft 16-1. The flat spring 15-9 is for maintaining the engagement of the pin 15-8 with the thread. The pin 15-8 is formed by press fitting it to the carriage arm 15-1. The carriage mechanism 15 is driven in the radial direction of the magnetic disk in response to the rotation of the rotation shaft 16-1.

The rotation shaft 16-1 is supported by a bearing 11-12 at the end thereof. The bearing 11-12 is formed in a bent portion 11-11 formed by means of cutting and lifting a portion of the chassis 11. The portion of the carriage base body 15-6 on the opposite side to the carriage arm 15-1 is slidably supported by the guide bar 15-2.

The upper carriage 15-5 is mounted on a spring plate 16-2 fixed on the upper surface of the carriage base body 15-6. The upper carriage 15-5 rotates about the border portion between the upper carriage 15-5 and the carriage base body 15-6. The magnetic disk which is not shown is inserted between the lower carriage 15-4 and the upper carriage 15-5 with the upper carriage 15-5 being rotated upward. After insertion and mounting of the magnetic disk, the upper carriage 15-5 rotates downward and the upper and the lower magnetic heads approach the top and the back surfaces, respectively, of the magnetic disk.

A spring mounting section is projected from the back surface of the carriage base body 15-6. A coil spring 16-3 is provided on the spring mounting section. A part of the coil spring 16-3 is extended to and abutted with the upper surface of the upper carriage 15-4. The coil spring 16-3 thus serves as biasing means to return the upper carriage 15-4 rotated upward and to force the magnetic heads against the magnetic disk.

Figure 17:
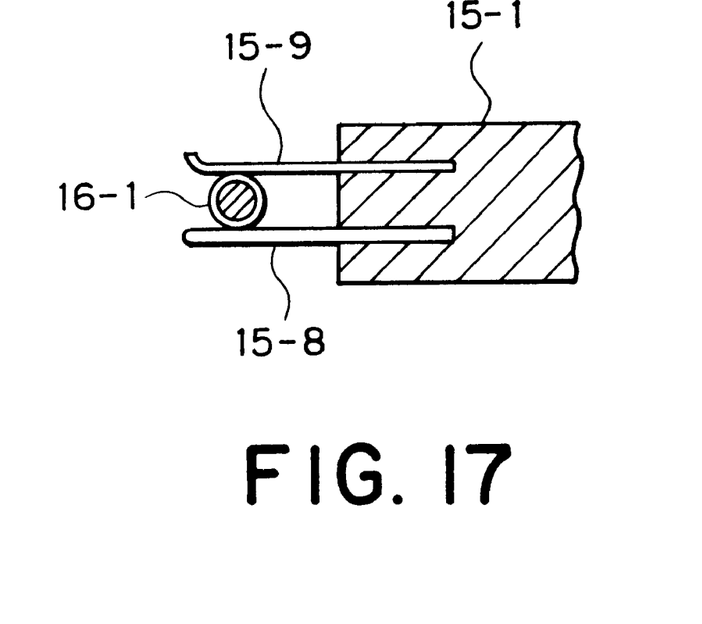
FIG. 17 is a view showing a rotation shaft arranged between members extending from a carriage arm.

It is noted that recent magnetic disk drives have the pin 15-8 and the spring plate 15-9 of which locations are changed for reducing the size of the drive, as shown in FIG. 17. However, the pin 15-8 can be displaced out of the helical thread in the rotation shaft 16-1 anyway when the magnetic disk drive is subjected to impact or vibration as described above. This is because the bearing 11-12 has a play to support the rotation shaft 16-1. The displacement causes the rotation shaft 16-1 to be sandwiched between the pin 15-8 and the spring plate 15-9, preventing completely the rotation of the stepping motor 16 with a small output torque.

Figure 18:
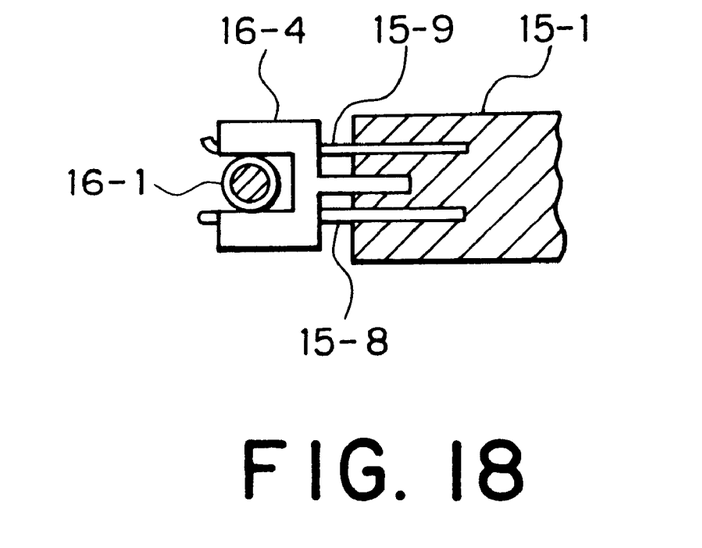
FIG. 18 is a view for use in describing impact and vibration measures for a rotation shaft shown in FIG. 17.

Referring to FIG. 18, an impact measure for the aforementioned rotation shaft 16-1 is described. In FIG. 18, a stopper 16-4 is provided on the carriage arm 15-1 at the end thereof for restrict up and down movement of the rotation shaft 16-1. The stopper 16-4 moves along with the carriage arm 15-1 with a small gap kept from the outer peripheral surface of the rotation shaft 16-1.

Such stopper 16-4 prevents the rotation shaft 16-1 from moves up and down even when the magnetic disk drive is subjected to impact or vibration. Accordingly, undesirable displacement of the pin 15-8 can be prevented which otherwise may be displaced out of the helical thread in the rotation shaft 16-1 and runs onto the outer peripheral surface of the rotation shaft 16-1.

The present invention has thus been described in conjunction with the case where it is implemented in the magnetic disk drive as shown in FIG. 1. However, the present invention is not limited to the application to the magnetic disk drive as shown in FIG. 1 since there are various types of magnetic disk drives. For example, the carriage mechanism is not limited to those driven by a stepping motor. Instead, carriage mechanisms driven by a so-called voice coil motor may be used for the magnetic disk drives, as described in, for example, Japanese Patent Laid-open No. 9-213030. The present invention can equally be applied to the magnetic disk drives of this kind.

As described above, according to the present invention, the locking mechanism is provided to prevent displacement of the disk holder, which otherwise may cause due to impact or vibration affecting the magnetic disk drive. This locking mechanism contributes to elimination or a trouble or damage of the disk holder due to the impact or vibration on the magnetic disk drive.

In addition, according to the present invention, the locking mechanism is provided to prevent displacement of the disk holder as well as rotation of the upper carriage, due to the impact or vibration on the magnetic disk drive. Therefore, it is possible to avoid a trouble or damage of the disk holder and magnetic heads due to the impact or vibration on the magnetic disk drive.

What is claimed is:

1. A magnetic disk drive comprising: an eject plate mounted on a chassis, said eject plate being slidable in the direction of mounting and ejecting a magnetic disk by means of an external force; a disk holder assembled with said eject plate for holding the magnetic disk, said disk holder being slidable up and down in cooperation with the sliding movement of said eject plate; and a carriage mechanism having magnetic heads mounted thereon for recording and reproducing data on and out of the magnetic disk, said carriage mechanism holding the magnetic heads in a manner that the magnetic heads are movable in a predetermined radial direction relative to the magnetic disk, said magnetic disk drive further comprising:

a locking mechanism for restricting downward sliding movement of said disk holder, said locking mechanism being provided at a position close to a front end of the magnetic disk mounted on the magnetic disk drive, wherein said locking mechanism is located at a first position to lock said disk holder, the first position being between the chassis and said disk holder when no magnetic disk is mounted on the magnetic disk drive and the locking mechanism engages with the front end of the magnetic disk when it is mounted on the disk drive and moves to a second position away from the first position between said chassis and said disk holder.

2. A magnetic disk drive as claimed in claim 1, wherein said locking mechanism is formed of a spring plate attached to the chassis to allow automatic return of said locking mechanism from the second position to the first position when the magnetic disk is removed out of the magnetic disk drive.

3. A magnetic disk drive as claimed in claim 1, wherein said carriage mechanism comprises:

a lower carriage having a magnetic head mounted thereon for a back surface of the magnetic disk; and an upper carriage having another magnetic head mounted thereon for a front surface of the magnetic disk, and wherein said locking mechanism further comprises:

a locking plate rotatably mounted to said disk holder in parallel with the major surface of said disk holder, said locking plate having:

a first locking member that is located at a locking position between an edge of said disk holder and said chassis for restricting downward sliding of said disk holder when no magnetic disk is mounted on the magnetic disk drive;

a second locking member that is located at a locking position just beneath said upper carriage for restricting downward rotation of said upper carriage when no magnetic disk is mounted on the magnetic disk drive; and an engaging member adapted to engage with a front end of the magnetic disk, when mounted on the magnetic disk drive, and to rotate said locking plate as a whole, said first locking member moves out of the position between said chassis and said disk holder while said second locking member moves out of the position just beneath said upper carriage, both in response to the rotation as a result of engagement of said engaging member with the front end of the magnetic disk, and said locking mechanism further comprises a spring member adapted to automatically return said first and said second locking members to their respective locking positions when the magnetic disk is removed out of the magnetic disk drive.

* * * * *